H. G. WOLF.
BUSHING FOR PULLEYS, GEARS, AND THE LIKE.
APPLICATION FILED NOV. 3, 1908.
941,602.
Patented Nov. 30, 1909.
2 SHEETS—SHEET 1.
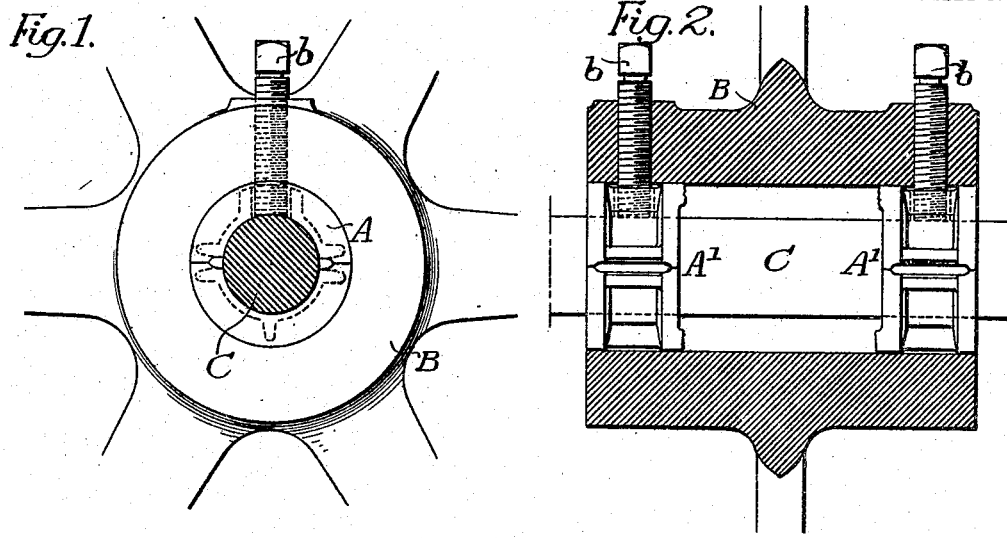
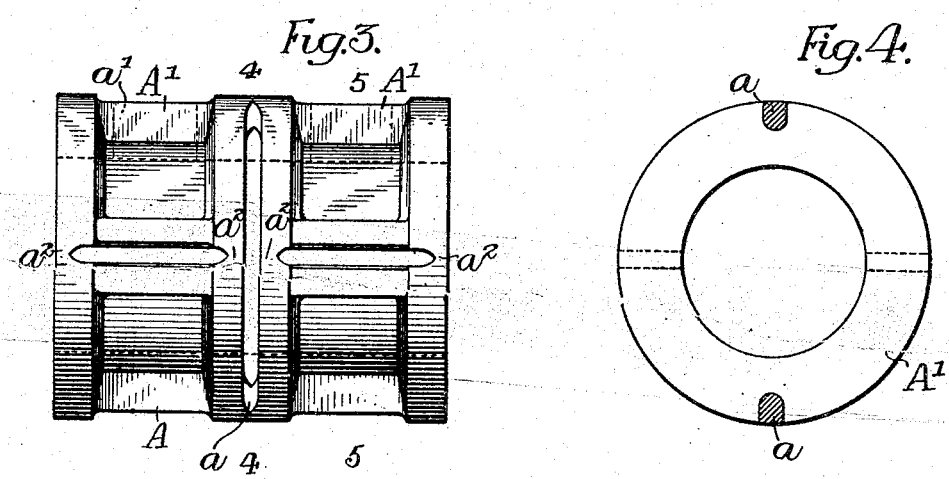
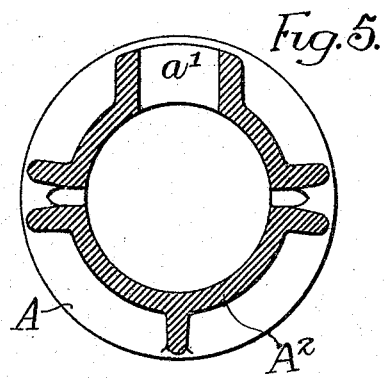
Witnesses:-
Walter Chism
Augustus B. Appes
Inventor-
Harry G. Wolf.
by his Attorneys
Howson & Howson

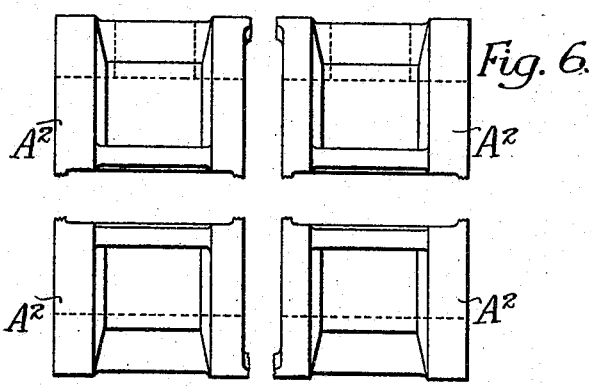
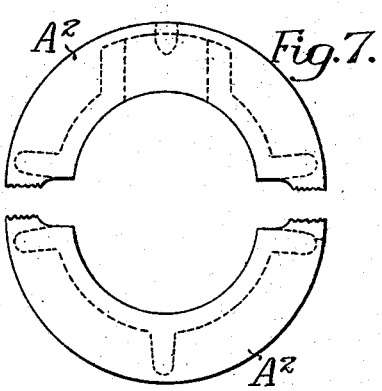
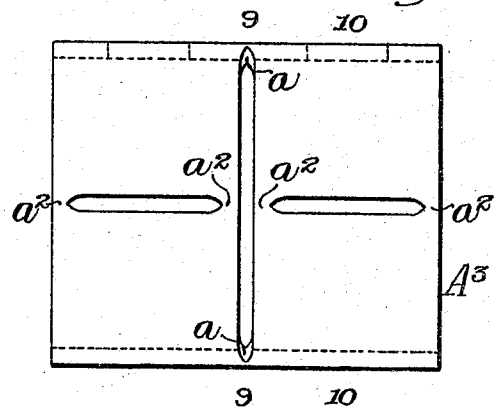
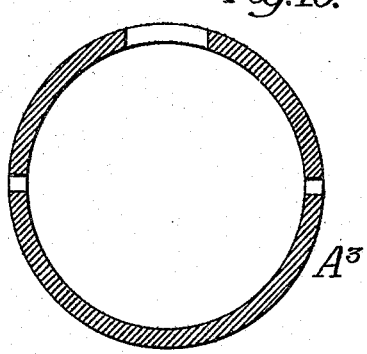

UNITED STATES PATENT OFFICE.

HARRY G. WOLF, OF CHAMBERSBURG, PENNSYLVANIA, ASSIGNOR TO THE WOLF COMPANY, OF CHAMBERSBURG, PENNSYLVANIA, A CORPORATION OF PENNSYLVANIA.

BUSHING FOR PULLEYS, GEARS, AND THE LIKE.

941,602.  Specification of Letters Patent.  Patented Nov. 30, 1909.

Application filed November 3, 1908. Serial No. 460,878.

*To all whom it may concern:*

Be it known that I, HARRY G. WOLF, a citizen of the United States, residing in Chambersburg, Pennsylvania, have invented certain Improvements in Bushings for Pulleys, Gears, and the Like, of which the following is a specification.

One object of my invention is to provide and interchangeable bushing especially adapted for use in mounting gears, pulleys, etc. on shafts, and which shall be of such a construction that just prior to its use it may be separated into a plurality of parts whereby it is possible to accurately and rigidly mount the pulley, gear, etc. as desired.

Another object of the invention is to provide a bushing which, after being accurately constructed, may be separated into a plurality of parts whereby a pulley, gear, etc. may be supported at two or more points upon a shaft to which it is connected;—the construction being such that said bushing may be readily prepared for use and applied.

A further object of my invention is to provide a bushing for use in connection with solid pulleys, whereby it is possible to quickly adjust a number of such pulleys to their proper positions on a shaft, and then, by means of suitable bushings constructed according to my invention, permanently mount said pulleys in place.

These objects and other advantageous ends I secure as hereinafter set forth, reference being had to the accompanying drawings, in which:—

Figure 1, is an end elevation of the hub of a pulley illustrating my invention as applied thereto; Fig. 2, is a vertical section of the construction of parts shown in Fig. 1; Fig. 3, is a side elevation of a bushing constructed according to my invention; Figs. 4 and 5 are vertical sections on the lines 4—4, and 5—5 respectively, of Fig. 3; Figs. 6 and 7 are respectively side and end elevations of the bushing shown in Fig. 3, illustrating its parts as separated; Fig. 8, is a modified form of my invention; and Figs. 9 and 10 are vertical sections on the lines 9—9 and 10—10 respectively of Fig. 8.

As will be understood by those skilled in the art, it is frequently necessary that a pulley having a definite bore of hub, shall be rigidly mounted upon and fixed to a shaft whose diameter is less than that of said bore, and for this purpose it has been customary to provide bushings fitting the shaft and in turn fitted to the hub of the pulley. Owing to the length of pulley bore, it has been customary to provide bushings at the ends only thereof, and much trouble has hitherto been experienced by reason of the fact that these bushings were separately constructed and almost invariably were found, when put in use, to slightly vary as to their internal or external diameters. In order to overcome this objection, which in many cases was a most serious one, I cast the two bushings of a given size as a single piece A, having the requisite interior and exterior diameters. The construction is such, however, that each bushing consists of two similar parts A', joined by two relatively small and weak metallic lugs or bridges $a$. Each of said parts is of the dimensions required for one of the two bushings commonly used for each pulley and as is obvious, in boring the interior and turning down the exterior to the proper diameters, it is possible to make both of these parts absolutely identical with the greatest ease. Each of said parts is provided with an opening $a'$ to permit of the passage of a set screw $b$ whereby the pulley B is rigidly held to the shaft C, and if desired, each of the sections A' of the original casting may in turn be so made that it consists of two semi-cylindrical parts $A^2$ joined by four small and easily broken portions or bridges indicated at $a^2$.

It will be understood that a dealer in this particular class of goods would keep in stock bushings of the various internal and external diameters required by the trade; each bushing having its parts integral, as shown in Fig. 3.

The user of the device in applying the same to a pulley and shaft, would first break apart the two bushing sections A', and in order to most conveniently mount them, would break each section into two semi-cylindrical parts $A^2$. Each pair of these parts would then be mounted upon a shaft C, within the ends of the hub of the pulley B, as shown in Fig. 2.

In Figs. 1 to 7 inclusive, I have illustrated a form of bushing provided with hollow portions or recesses whereby it is materially lightened in weight. If, however, the difference between the interior diameter of the pulley hub and the diameter of the shaft is but small, the bushing may be given the form illustrated at A³ in Fig. 8. The construction, however, is identical with that hitherto described, inasmuch as the bushing proper consists of two cylindrical and integrally connected parts capable of being broken apart by a slight hammer tap, and each of these parts in turn consists of two semi-cylindrical integral sections also capable of being broken apart by a blow from a hammer.

By the use of my invention I am enabled to very quickly and conveniently adjust a number of solid pulleys or the like in their proper places upon a shaft where otherwise considerable time and labor has been necessary. For example, if it be desired to mount a half dozen pulleys upon a 2 7/16 inch shaft, it has hitherto required considerable fitting and hard labor to bring the various pulleys to their proper positions owing to the slight variations in diameter or irregularities of the surface of the shaft. If, however, all of the pulleys should be bored to say 2 15/16 inch, it is a comparatively simple and speedy operation to place these in the desired positions upon a shaft of the diameter above noted, after which split interchangeable bushings constructed according to my invention may be employed to properly support and fasten said pulleys to the shaft.

It will be noted that by breaking apart the halves of each bushing, as well as the two cylindrical parts of each half, the separated edges each possesses more or less roughened surfaces. As a result, when the halves of each bushing are brought together within a pulley, their adjacent edges have a greater or less number of intermeshing projections whereby said parts are held together as a single piece and prevented from independent longitudinal movement.

I claim:—

1. A bushing consisting of two cylindrical sections with an easily breakable lug or lugs integrally connecting them.

2. A bushing consisting of a plurality of cylindrical parts connected together by relatively thin and easily broken bridges, each of said parts consisting of semi-cylindrical sections also connected to each other by relatively thin and easily broken bridges.

In testimony whereof, I have signed my name to this specification, in the presence of two subscribing witnesses.

HARRY G. WOLF.

Witnesses:
LYDIA M. KUMP,
J. C. WALK.